United States Patent [19]
He

[11] Patent Number: 6,088,432
[45] Date of Patent: *Jul. 11, 2000

[54] METHOD AND SYSTEM FOR PROVIDING IMMEDIATE AUDIO OR DATA RESPONSE BILLING INFORMATION TO A USER

[75] Inventor: Jingsha He, San Jose, Calif.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/862,288

[22] Filed: May 23, 1997

[51] Int. Cl.⁷ .................................................. H04M 15/00
[52] U.S. Cl. .......................... 379/114; 379/201; 379/115; 379/144
[58] Field of Search .............................. 379/89, 114, 115, 379/132, 126, 127, 67, 201, 112, 130, 124; 455/406–410, 405

[56] References Cited

U.S. PATENT DOCUMENTS

| | | | |
|---|---|---|---|
| Re. 34,380 | 9/1993 | Sleevi | 379/67 |
| 5,195,126 | 3/1993 | Carrier et al. | 379/46 |
| 5,222,120 | 6/1993 | McCleod et al. | 379/88 |
| 5,297,189 | 3/1994 | Chabernaud | 379/58 |
| 5,313,515 | 5/1994 | Allen et al. | 379/88 |
| 5,321,740 | 6/1994 | Gregorek et al. | 379/67 |
| 5,333,186 | 7/1994 | Gupta | 379/201 |
| 5,381,467 | 1/1995 | Rosinski et al. | 379/114 |
| 5,428,670 | 6/1995 | Gregorek et al. | 379/67 |
| 5,436,957 | 7/1995 | McConnell | 379/88 |
| 5,448,625 | 9/1995 | Lederman | 379/67 |
| 5,452,350 | 9/1995 | Reynolds et al. | 379/220 |
| 5,483,581 | 1/1996 | Hird et al. | 379/132 |
| 5,506,893 | 4/1996 | Buscher et al. | 379/114 |
| 5,526,423 | 6/1996 | Ohuchi et al. | 379/67 |
| 5,627,887 | 5/1997 | Freedman | 379/144 |
| 5,642,407 | 6/1997 | He | 379/87 |
| 5,661,781 | 8/1997 | Dejager | 379/67 |
| 5,692,037 | 11/1997 | Friend | 379/114 |
| 5,703,935 | 12/1997 | Raissyan et al. | 379/88 |
| 5,787,150 | 7/1998 | Reiman et al. | 379/114 |
| 5,859,900 | 1/1999 | Bauer et al. | 379/114 |
| 5,859,902 | 1/1999 | Freedman | 379/114 |
| 5,917,902 | 6/1999 | Saucier | 379/114 |

*Primary Examiner*—Paul Loomis
*Assistant Examiner*—Rexford N Barnie

[57] ABSTRACT

An immediate audio or data response billing information method and system allows an authorized caller or called party to a toll telephone call to receive the billing information record of the toll telephone call either during the toll telephone call or after the toll telephone call, but prior to termination of the requesting party's telephone connection to the telephone system. An authorized caller or called party may request billing information by entering a valid DTMF sequence. The billing information is extracted from the originating switch, which maintains the billing information record for the call, upon request. If the authorized party requesting billing information is the caller, the billing information is then provided directly to the caller from the originating switch by audio or data stream means. If, however, the authorized party requesting information is the called party, the billing information is provided to the called party by audio or data stream means.

15 Claims, 6 Drawing Sheets

152

| Called Number |
|---|
| Call Duration |
| Carrier |
| Plan |
| Time of Day |
| Day of Week |
| Per Unit Rate |
| Total Charge |
| * * * |

# METHOD AND SYSTEM FOR PROVIDING IMMEDIATE AUDIO OR DATA RESPONSE BILLING INFORMATION TO A USER

CROSS REFERENCE TO RELATED APPLICATIONS

The subject matter of the present application is related to co-pending U.S. patent application Ser. No. 08/862,282 entitled "METHOD AND SYSTEM FOR TOLL CHARGE AND RATE INQUIRY SERVICE FOR PORTABLE NUMBERS" filed on May 23, 1997, and co-pending U.S. patent application Ser. No. 08/862,283 entitled "METHOD AND SYSTEM FOR DETERMINING OPTIMAL CALL PERIODS IN ACCORDANCE WITH CALLER AND CALLEE PARAMETERS" filed May 23, 1997, which are commonly assigned to the assignee hereof and which are incorporated herein by reference.

FIELD OF THE INVENTION

The present invention relates generally to providing telephone billing information to a party of a toll telephone call and more specifically to immediately providing requested telephone billing information in audio or data form in response to a valid request by the party.

BACKGROUND OF THE INVENTION

The telephone industry is currently composed of several major telephone service providers which each offering a variety of pricing plans and structures. The price charged a paying party for a toll telephone call may depend upon a variety of factors, including the time of the day, the day of the week, the called party's service provider in relation to the caller, where the caller is calling from, how frequently the called party is called, arrangements for payment of the toll telephone call, whether operator assistance was rendered, and other relevant pricing factors.

In the prior art, the party to the toll telephone call responsible for payment of the toll charge, whether it be the caller or the called party, has no means of requesting and then immediately receiving an audio or data reading of his/her billing record either during the toll telephone call itself or following completion of the toll telephone call. A party interested in such billing information must wait to receive a billing statement from the telephone service provider or contact the billing office of the telephone service provider following completion of the toll telephone call in order to obtain the billing information. At any rate, the party paying for the toll telephone call currently does, not have the means of requesting and then immediately receiving desired billing information either during a toll telephone call or upon completion of the toll telephone call.

There is thus an unmet need in the art for a party to a toll telephone call who is authorized to receive toll information to be able to request and then to immediately receive requested billing information. This need exists both during an on-going toll telephone call and just after a toll telephone call has been completed. The need for immediate receipt of billing information about the toll telephone call has become more important with the recent proliferation of individual pricing plans and structures that are currently available from competing telephone service providers. With so many pricing structures from which to chose, it is desirable that a paying party to a toll telephone call be able to easily and readily monitor the toll charges levied by the telephone service provider selected to provide the toll telephone service.

SUMMARY AND OBJECTS OF THE INVENTION

It would be advantageous in the art for a party to a toll telephone call to be able to dynamically request and immediately receive audio response billing information during a toll telephone call, prior to termination of the party's telephone call connection.

It would further be advantageous in the art for a party to a toll telephone call to be able to dynamically request and immediately receive audio response billing information following completion of a toll telephone call, prior to termination of the party's telephone call connection.

It would be advantageous in the art for a party to a toll telephone call to be able to dynamically request and immediately receive data response billing information during a toll telephone call, prior to termination of the party's telephone call connection.

It would further be advantageous in the art for a party to a toll telephone call to be able to dynamically request and immediately receive data response billing information following completion of a toll telephone call, prior to termination of the party's telephone call connection.

Therefore, according to the present invention, an authorized party to a toll telephone call on an automated telephone system is able to request and then immediately receive billing information about the toll telephone call. The authorized party is able to dynamically access billing information about the toll telephone call either during the toll telephone call or following completion of the toll telephone call so long as the authorized party's request for the billing information is made prior to termination of the authorized party's telephone call connection.

An authorized caller or called party may request billing information by entering a valid DTMF sequence. The billing information is extracted from the originating switch, which maintains the billing information record for the call, upon request. If the authorized party requesting billing information is the caller, the billing information is then provided directly to the caller from the originating switch by audio or data stream means. If, however, the authorized party requesting information is the called party, the billing information is provided to the terminating switch from the originating switch before being provided to the called party by audio or data stream means.

It is accordingly an object of the invention for an authorized party to a toll telephone call to be able to dynamically request and immediately receive audio response billing information during the toll telephone call, prior to termination of the authorized party's telephone call connection.

It is accordingly further an object of the invention for an authorized party to a toll telephone call to be able to dynamically request and immediately receive audio response billing information following completion of the toll telephone call, prior to termination of the authorized party's telephone call connection.

It is further an object of the invention for an authorized party to a toll telephone call to be able to dynamically request and immediately receive data response billing information during the toll telephone call, prior to termination of the authorized party's telephone call connection.

It is a further object of the invention for an authorized party to a toll telephone call to be able to dynamically request and immediately receive data response billing information following completion of the toll telephone call, prior to termination of the authorized party's telephone call connection.

These and other objects of the invention will become apparent from the detailed description of the invention in which numerals used throughout the description correspond to those found in the drawing figures.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE INVENTION

Figure 1:
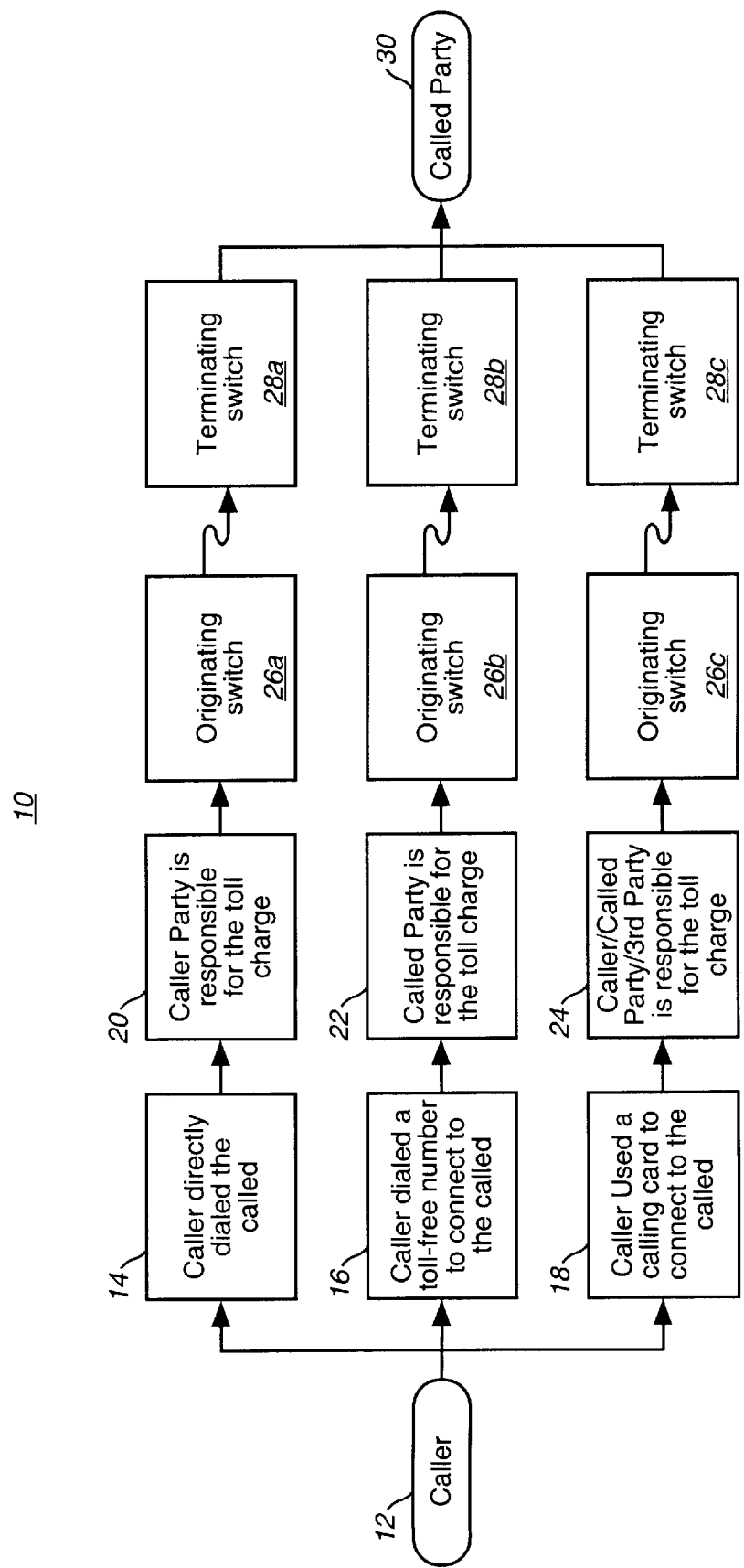
FIG. 1 is a simplified block diagram that illustrates various ways for a caller to connect to a called party during a toll telephone call, according to the present invention.

The present invention describes a method and system for providing immediate audio or data response billing information to a party to a toll telephone call who is authorized to access billing information. The authorized party to the toll telephone call may access billing information during the toll telephone call or after completion of the toll telephone call, but prior to the termination of the authorized party's telephone call connection that occurs when the authorized party hangs up the telephone receiver. The authorized party may be either the caller, the party placing the telephone call, or the called party, the party receiving the telephone call, so long as the party is authorized to access billing information pertaining to the toll telephone call.

In the present invention, the originating switch and the terminating switch is capable of accessing the billing information record for the toll telephone call between the caller and the called party. Whether the originating switch or the terminating switch of the automated telephone system will provide the requested billing information to the authorized party who requested it depends upon whether the authorized party is the caller or the called party. By definition, the originating switch is associated with the calling party, since it is the calling party who initiates the toll telephone call. The terminating switch is associated with the called party who receives the toll telephone call. Once the telephone call is established, the originating switch processes the caller's telephone call connection to the telephone system and maintains the billing information record of the toll telephone call. The terminating switch processes the called party's telephone call connection to the telephone system. The telephone call between the caller and the called party is terminated when either the caller or the called party hangs up the telephone or otherwise terminates the party's telephone call connection to the telephone system.

The caller may be connected to the called party by directly dialing the called party, dialing a toll-free number, calling collect, or using a calling card to connect to the called party. The caller is typically responsible for the toll charge when directly dialing the called party or when using a calling card to connect to the called party. In these circumstances, the caller and not the called party would normally be authorized to access the billing information of the toll telephone call. The called party, on the other hand, is typically responsible for the toll charge when the caller connects to the called party by dialing a toll-free number or by calling the called party collect. In these circumstances, the called party and not the caller, is normally authorized to access the billing information of the toll telephone call.

Once the toll telephone call is established, the authorized caller or called party may request billing information during or immediately upon completing the toll telephone call by entering into the telephone keypad a valid Dual-Tone Multi-Frequency Signaling (DTMF) sequence, such as #7 for example. The caller may receive the billing information only if the caller is paying the toll or otherwise has authority to access the billing information. The called party, conversely, may receive the billing information only if the called party is paying the toll or otherwise has authority to access the billing information. A party authorized to receive billing information will have to enter valid DTMF sequence.

If the caller requests billing information by entering a valid DTMF sequence, the originating switch will verify that the caller has access authority, extract the billing information record, and provide the billing information to the caller either audibly or by data stream. If the called party requests billing information by entering a valid DTMF sequence, the terminating switch will verify that the called party has access authority, request the billing information record from the originating switch, and, upon receipt of the billing information record from the originating switch, provide the billing information to the called party either audibly or by data stream.

If the toll telephone call between the caller and the called party is terminated by the called party hanging up the telephone, the originating switch will continue to process the caller's telephone connection until the caller terminates his telephone call connection by hanging up the telephone receiver. The caller may request billing information by entering a valid DTMF sequence at any time prior to terminating the caller's telephone connection by hanging up the telephone receiver.

If the toll telephone call between the caller and the called party is terminated by the caller hanging up the telephone, the terminating switch will continue to process the called party's telephone connection until the called party terminates his telephone call connection by hanging up the telephone receiver. The called party may request billing information by entering a valid DTMF sequence at any time prior to the called party hanging up the telephone receiver.

Referring to FIG. 1, a simplified block diagram 10 that illustrates various ways for a caller to connect to a called party, according to the present invention, is shown. Caller 12 either dialed directly as shown in Block 14, dialed a toll-free number as shown in Block 16, or used a calling card as shown in Block 18 to connect to the Called Party as shown in Block 30. If the Caller 12 directly dialed 14 the Called Party 30, then the Caller 12 is responsible for the toll charge as shown in Block 20. During the toll telephone call, the billing information is kept in the originating switch as shown in Block 26a. When the Caller 12 requests the billing information it is extracted from the originating switch 26a and is presented to Caller 12 either audibly or by data stream.

If the Caller 12 dialed a toll-free number as shown in Block 16 to connect to the Called Party 30, then the Called Party 30 is responsible for the toll charge as shown in Block 22. Dialing a toll-free number as shown in Block 16 includes dialing either collect, or dialing an 800 or 888 number. During the toll telephone call, the billing information is kept in the originating switch as shown in Block 26b. When the Called Party 30 requests the billing information, it is transferred from the originating switch 26b to the terminating switch as shown in Block 28b and is presented to Called Party 30 party either audibly or by data.

If the Caller 12 used a calling card as shown in Block 18 to connect to the Called Party 30, then the Caller 12, Called Party 30, or a Third party is responsible for the toll charge as shown in Block 22. During the toll telephone call, the billing information is kept in the originating switch as shown in Block 26c. When the Caller 12 requests the billing information, it is extracted from the originating switch 26c and is presented to Caller 12 either audibly or by data stream. If the Called Party 30 is responsible for the toll charge, then when the Called Party 30 requests the billing information, it is transferred from Originating Switch 26c to the Terminating Switch as shown in Block 28c and is presented to Called Party 30 either audibly or by data stream.

Figure 2:
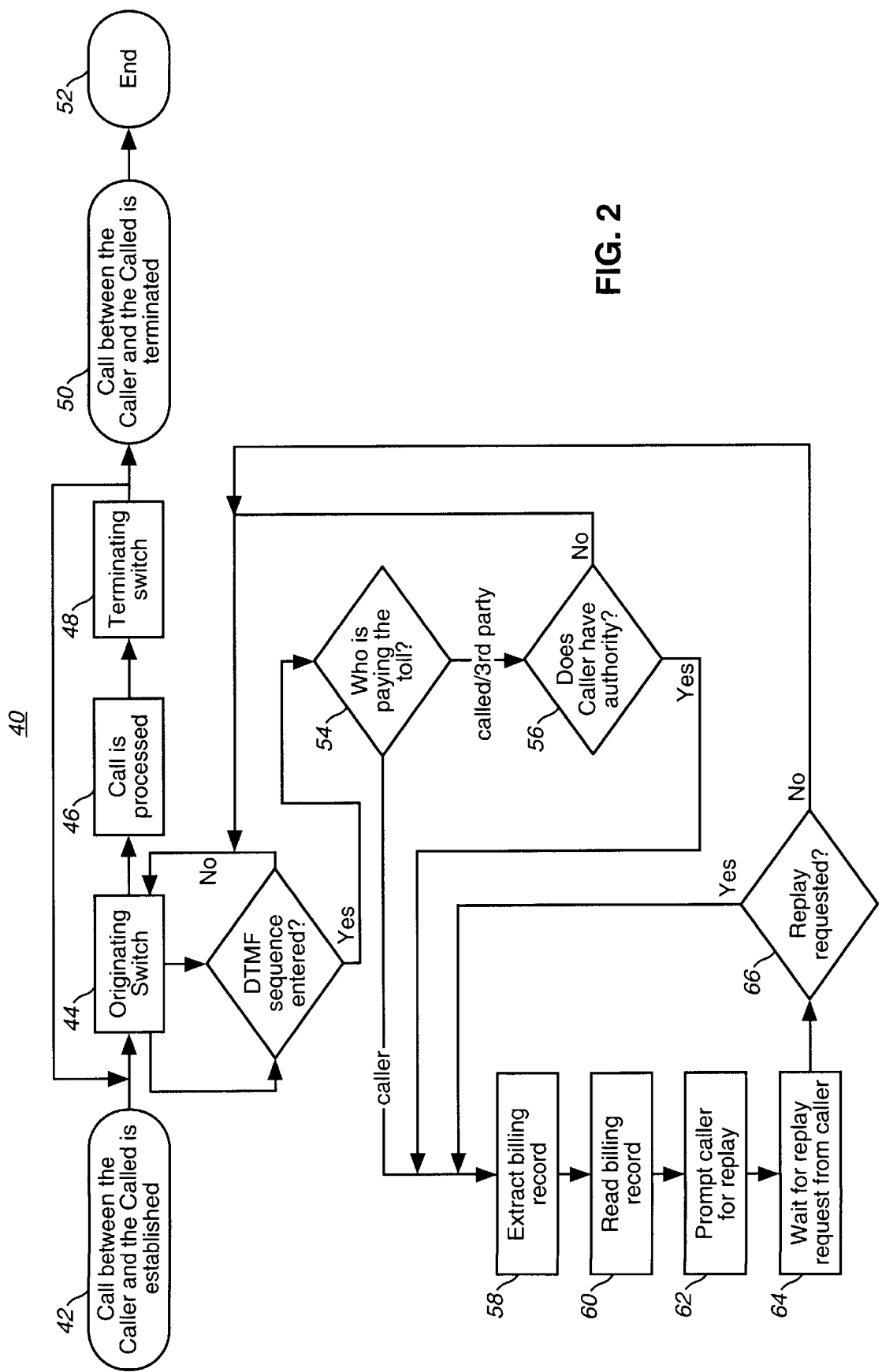
FIG. 2 is a flow chart illustrating the billing information request and response at the originating switch during a toll telephone call, according to the present invention.

Referring to FIG. 2, a flow chart 40 illustrating the billing information request and response at the originating switch during a toll telephone call, according to the present invention, is shown. First, at Block 42 and Block 46, the telephone call connection between the caller and the called party is established and the call is processed normally. Once the telephone call connection between the caller and the called party is established, originating switch 44 is responsible for processing the caller connection of the telephone call and terminating switch 48 is responsible for processing the called connection of the telephone call. As shown in Block 50, the toll telephone call between the caller and the called party is terminated when either the caller or the called party hangs up the telephone.

During the toll telephone call, Decision Block 52 inquires whether the caller has entered a valid DTMF sequence, such as #7. If an appropriate DTMF sequence was not entered, then the Originating Switch 44 continues to process the call normally. If the valid DTMF sequence for requesting billing information was entered, then the flow continues on to Decision Block 54. Decision Block 54 inquires who is responsible for paying the toll for the toll telephone call between the caller and the called party. If the called party or a third party is responsible for paying the toll, then the flow continues on to Decision Block 56. If the caller is responsible for paying the toll, then the flow continues on to Block 58. Decision Block 56 inquires whether the caller has authority to access the billing information. If no, then normal processing continues at the Originating Switch 44. If yes, then the flow continues on to Block 58.

Beginning at Block 58, the billing information is accessed. At Block 58, the billing record is extracted. The billing record is provided to the caller either orally or by data stream at Block 60. The data stream may be configured to be received by hearing impaired parties, using the TTY or the TDD standards, or may be a standard computer signal for computer access. The caller is prompted for whether a replay is desired at Block 62 and the system pauses for a response at Block 64. Again the prompt to the caller may be either oral or by data stream at Block 62 and the data stream may be similarly configured to be received by hearing impaired parties or may be a standard computer signal. Decision Block 66 inquires whether the caller desires a replay of the billing information. If a replay is desired, then the flow continues on to Block 58. If a replay is not desired, then normal processing continues at originating switch 44.

Figure 3:
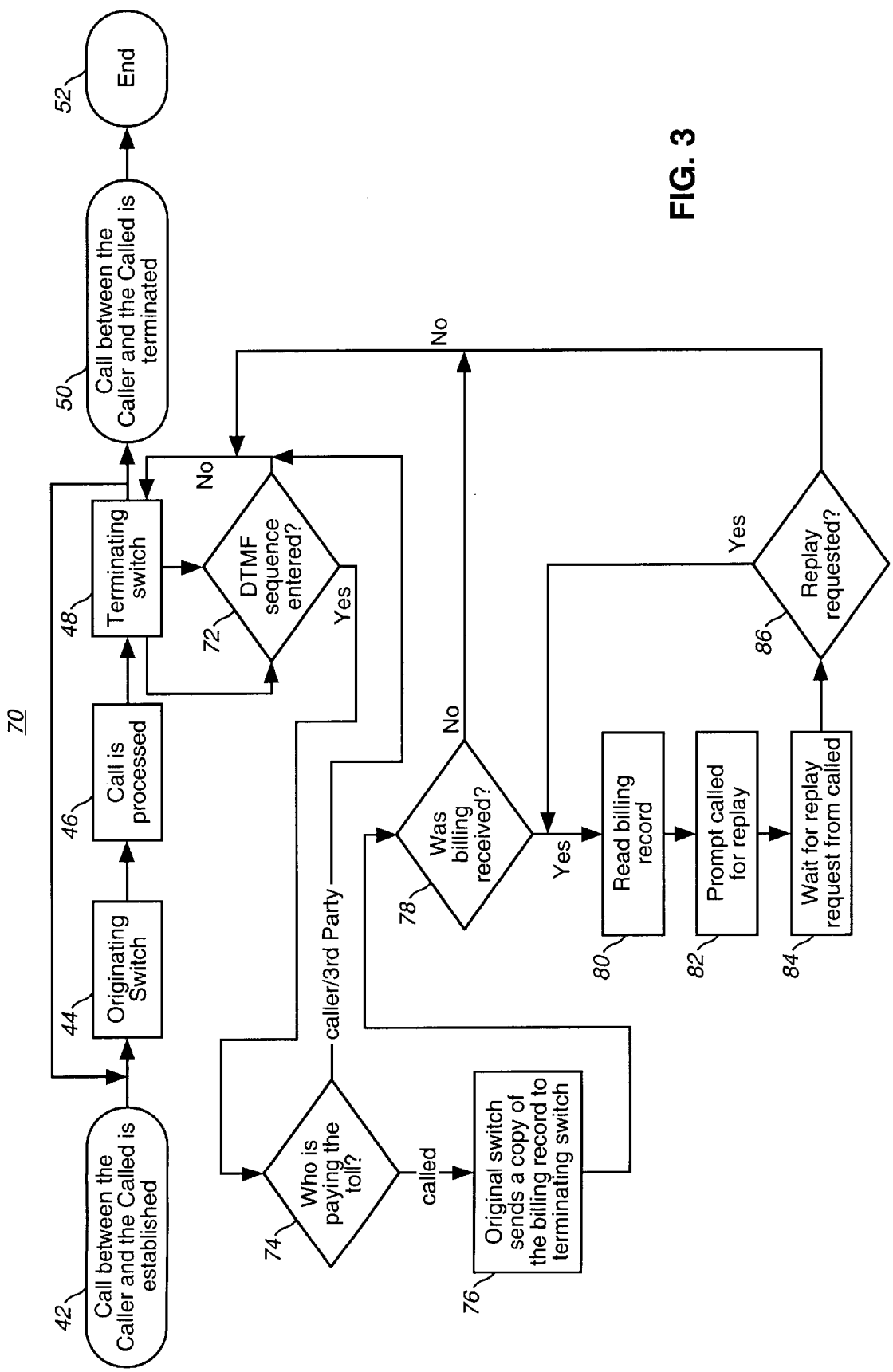
FIG. 3 is a flow chart illustrating the billing information request and response at the terminating switch during a toll telephone call, according to the present invention.

Referring to FIG. 3, a flow chart 70 illustrating the billing information request and response at the terminating switch during a toll telephone call of the present invention is shown. The toll telephone call between the caller and the called party is established and the call is processed normally at Block 42 and Block 46. Once the toll telephone call between the caller and the called party is established, the originating switch 44 is responsible for processing the caller connection and the terminating switch 48 is responsible for processing the called connection of the telephone call. As shown in Block 50, the toll telephone call between the caller and the called party is terminated when either the caller or the called party hangs up the telephone.

During the toll telephone call, Decision Block 72 inquires whether the called party has entered a valid DTMF sequence, such as #7, to request billing information. If an appropriate DTMF sequence was not entered, then the Terminating Switch 48 continues to process the call normally. If the valid DTMF sequence for requesting billing information was entered, then the flow continues on to Decision Block 74. Decision Block 74 inquires who is responsible for paying the toll for the telephone call between the caller and the called party. If the caller or a third party is responsible for paying the toll, then normal processing continues at Terminating Switch 44. If the called party is responsible for paying the toll, then the flow continues on to Block 76. At Block 76, Terminating Switch 48 requests and waits for a copy of the billing record to be sent from Originating Switch 44 to Terminating Switch 48. Decision Block 78 inquires whether the billing record was received from Originating Switch 44. If the billing information was received, then the flow continues on to Block 80. If the billing information was not received, then normal processing continues at Terminating Switch 48.

Beginning at Block 80, the billing information is accessed. The billing record is provided to the called party either orally or by data stream at Block 80. The data stream may be configured to be received by hearing impaired parties or by a standard computer signal for computer access. The called party is prompted for whether a replay is desired at Block 82 and the system pauses for a response at Block 84. Again the prompt to the called party may be either oral or by data stream at Block 84 and the data stream may be similarly configured to be received by hearing impaired parties or by a standard computer signal. Decision Block 86 inquires whether the called party desires a replay of the billing information. If yes, then the flow continues on to Block 30. If no, then normal processing continues at Terminating Switch 48.

Figure 4:
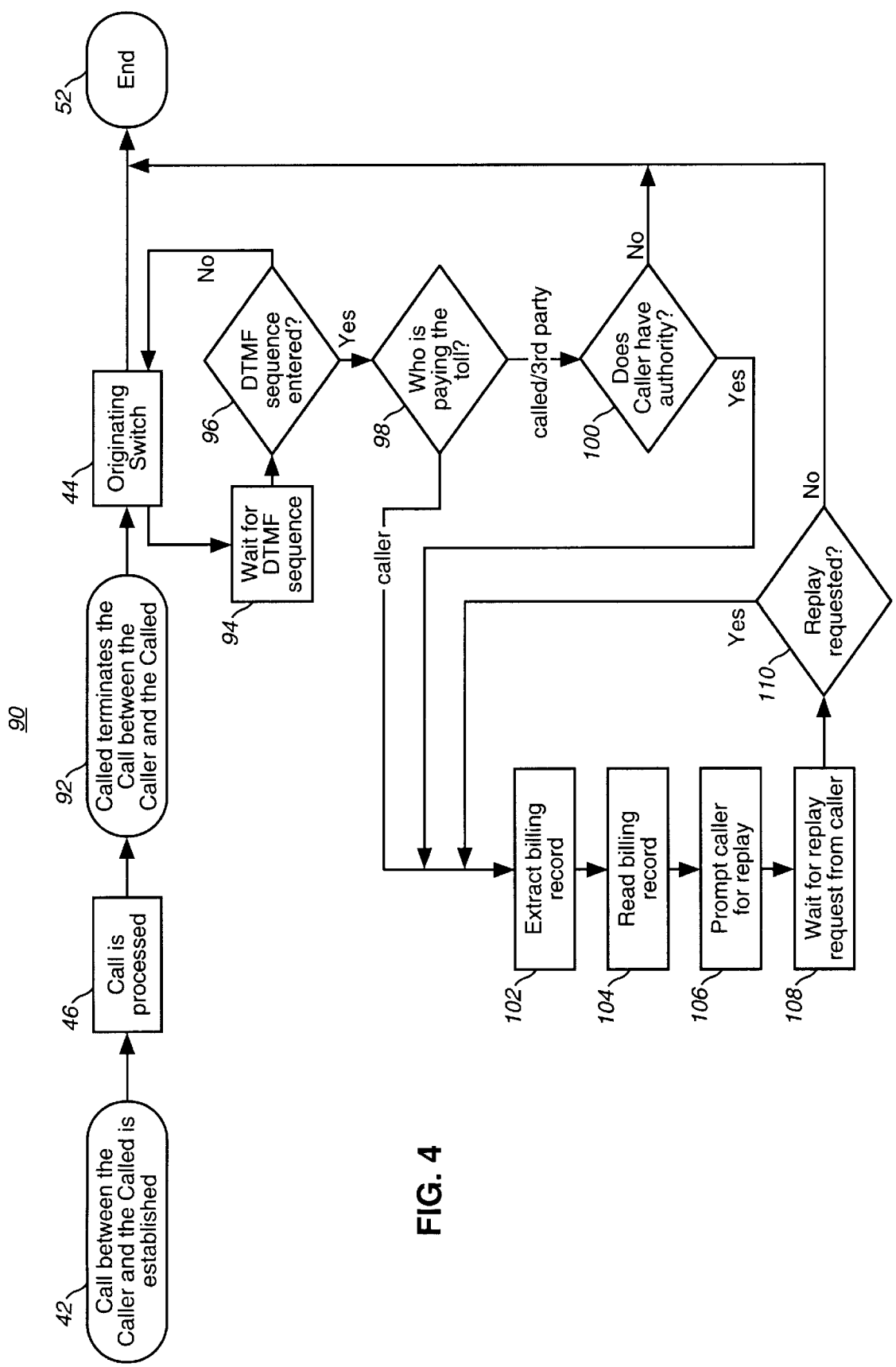
FIG. 4 is a flow chart illustrating the billing information request and response at the originating switch upon completion of a toll telephone call, prior to termination of the authorized party's telephone call connection, according to the present invention.

Referring to FIG. 4, a flow chart 90 illustrating the billing information request and response at the originating switch after the called party hangs up the telephone, according to the present invention, is shown. The call between the caller and the called party is established and the call is processed normally at Block 42 and Block 46. As shown in Block 92, the call between the caller and the called party is terminated when the called party hangs up the telephone. Once the called party hangs up the telephone, Originating Switch 44 is responsible for processing the caller connection of the telephone call until the caller hangs up the telephone.

After the called party hangs up the telephone terminating the call between the caller and the called party, Originating Switch 44 waits for the caller to enter a valid DTMF sequence, such as #7, at Block 94. Decision Block 96 inquires whether the caller has entered a valid DTMF sequence. If an appropriate DTMF sequence was not entered, then the Originating Switch 44 continues to wait for the caller to enter a valid DTMF sequence at Block 94. If the valid DTMF sequence for requesting billing information was entered, then the flow continues on to Decision Block 98. Decision Block 98 inquires who is responsible for paying the toll for the call between the caller and the called party. If the called party or a third party is responsible for paying the toll, then the flow continues on to Decision Block 100. If the caller is responsible for paying the toll, then the flow continues on to Block 102. Decision Block 100 inquires whether the caller has authority to access the billing information. If no, then processing is terminated at Originating Switch 44. If yes, then the flow continues on to Block 102.

Beginning at Block 102, the billing information is accessed. At Block 102, the billing record is extracted. The billing record is provided to the caller either orally or by data stream at Block 104. The data stream may be configured to be received by hearing impaired parties or be a standard computer signal for computer access. The caller is prompted for whether a replay is desired at Block 106 and the system pauses for a response at Block 108. Again the prompt to the caller may be either oral or by data stream at Block 106 and the data stream may be similarly configured to be received by hearing impaired parties or be a standard computer signal. Decision Block 110 inquires whether the caller desires a replay of the billing information. If yes, then the flow continues on to Block 102. If no, then processing is terminated at Originating Switch 44.

Figure 5:
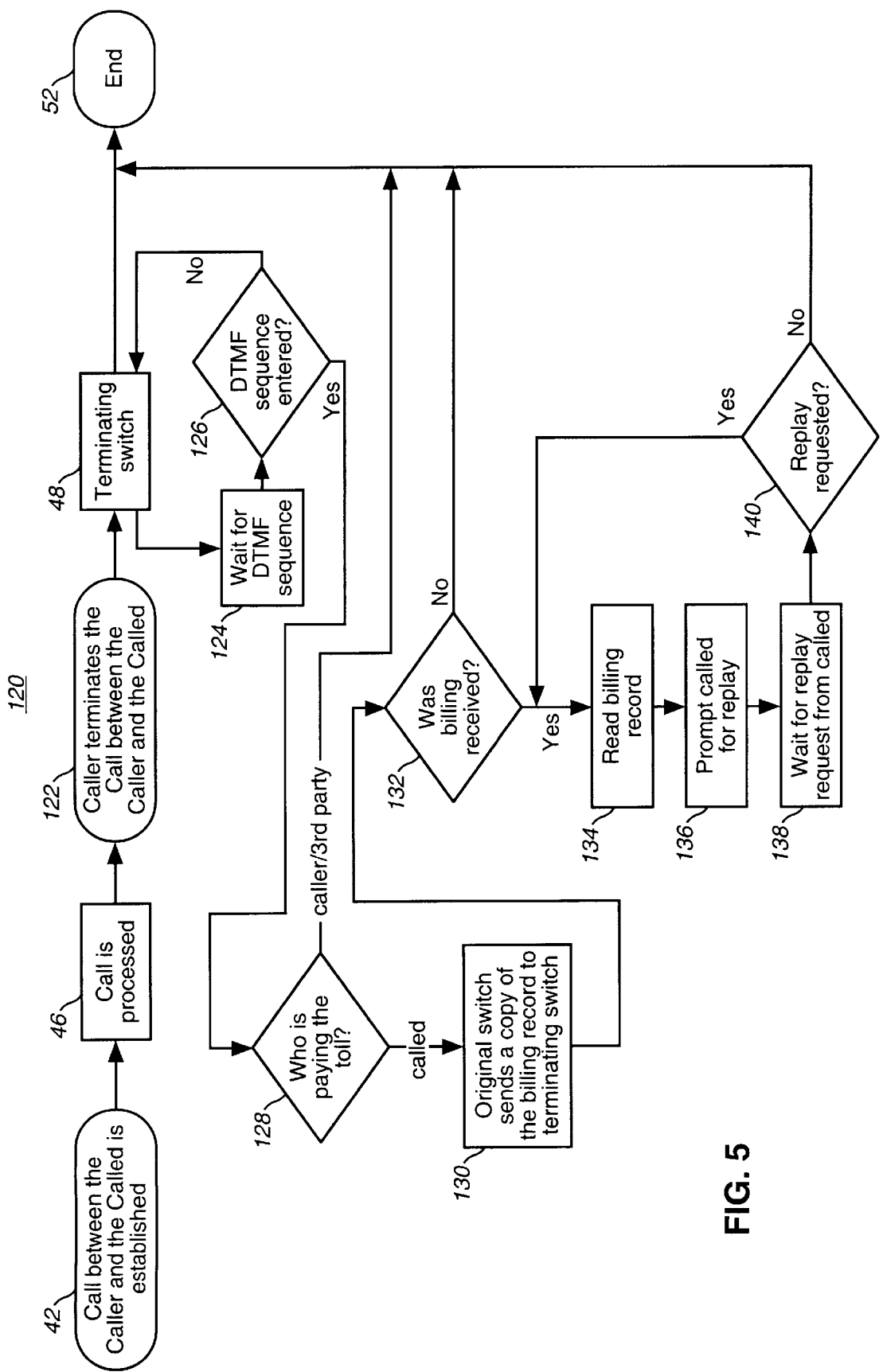
FIG. 5 is a flow chart illustrating the billing information request and response at the terminating switch upon completion of a toll telephone call, prior to termination of the authorized party's telephone call connection, according to the present invention.

Referring to FIG. 5, a flow chart 120 illustrating the billing information request and response at the terminating switch after the caller hangs up the telephone, according to the present invention, is shown. The call between the caller and the called party is established and the call is processed normally at Block 42 and Block 46. As shown in Block 122, the call between the caller and the called party is terminated when the caller hangs up the telephone. Once the caller hangs up the telephone, Terminating Switch 48 is responsible for processing the called connection of the telephone call until the called party hangs up the telephone.

After the caller hangs up the telephone terminating the call between the caller and the called party, the Terminating Switch 48 waits for the called party to enter a valid DTMF sequence, such as #7, at Block 124. Decision Block 126 inquires whether the caller has entered a valid DTMF sequence. If an appropriate DTMF sequence was not entered, then Terminating Switch 48 continues to wait for the called party to enter a valid DTMF sequence at Block 124. If the valid DTMF sequence for requesting billing information was entered, then the flow continues on to Decision Block 128. Decision Block 128 inquires who is responsible for paying the toll for the call between the caller and the called party. If the caller or a third party is responsible for paying the toll, then processing is terminated at Terminating Switch 48. If the called party is responsible for paying the toll, then the flow continues on to Block 130. At Block 130, Terminating Switch 48 requests and waits for a copy of the billing record to be sent to Terminating Switch 48 from the originating switch. Decision Block 132 inquires whether the billing record was received from the originating switch. If yes, then the flow continues on to Block 134. If no, then processing is terminated at Terminating Switch 48.

Beginning at Block 134, the billing information is accessed. The billing record is provided to the called party either orally or by data stream at Block 134. The data stream may be configured to be received by hearing impaired parties or be a standard computer signal for computer access. The called party is prompted for whether a replay is desired at Block 136 and the system pauses for a response at Block 138. Again, the prompt to the called party may be either oral or by data stream at Block 136 and the data stream may be similarly configured to be received by hearing impaired parties or be a standard computer signal. Decision Block 140 inquires whether the called party desires a replay of the billing information. If yes, then the flow continues on to Block 134. If no, then processing is terminated at Terminating Switch 48.

Figure 6:
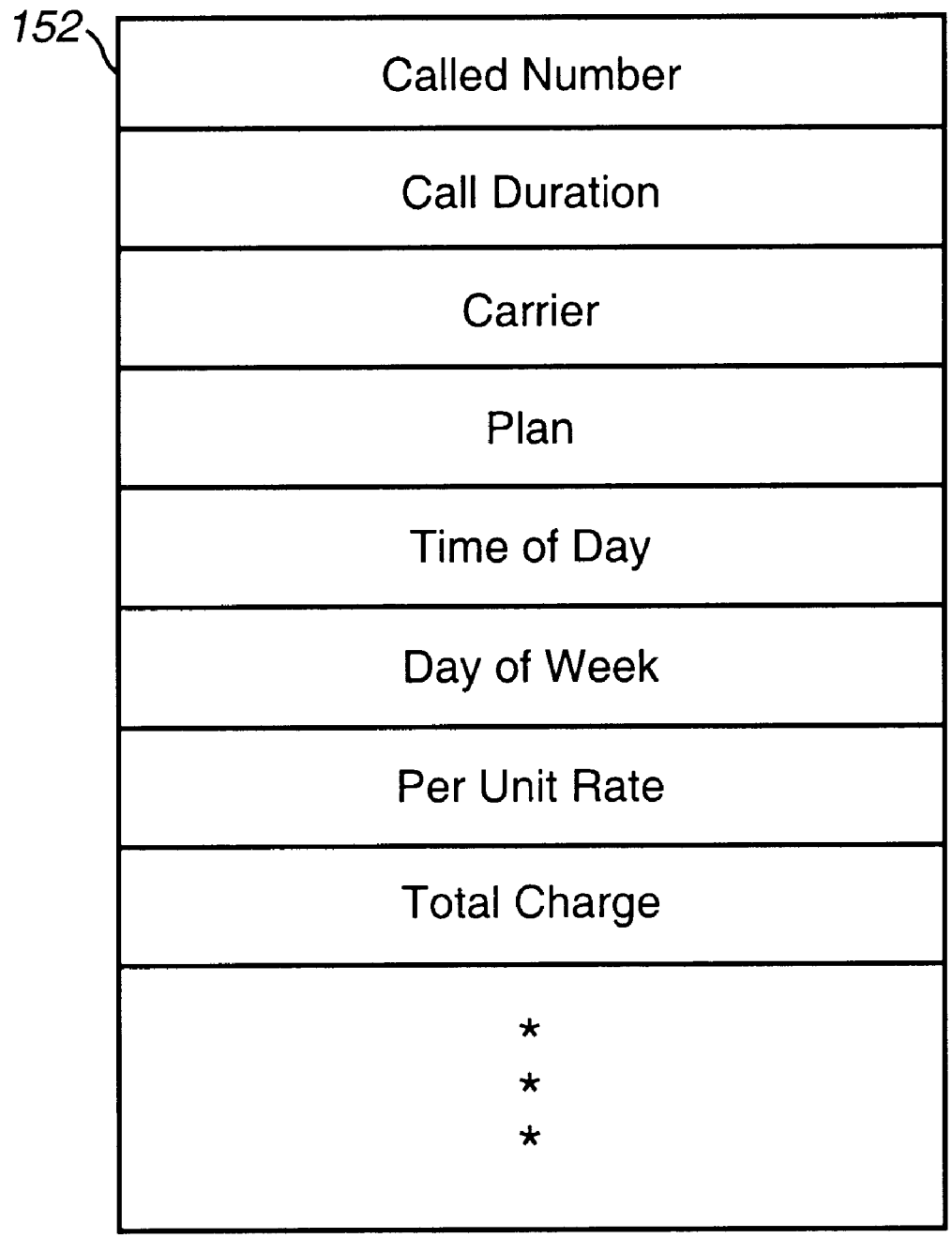
FIG. 6 is a representation of the billing information database, according to the present invention.

Referring to FIG. 6, a representation of the billing information database 150 of the present invention is shown. A Billing Record 152 of the billing information database may typically contain the following information: the telephone number called; the total call duration; the carrier for the party paying the toll; any plan information for the party paying the toll such as friends and family; the starting time of the telephone call; day of the week information such as whether this is a weekend or weekday; the per unit rate such as cost per minute; and the total charge of the telephone call. Other desired information may be contained within the billing information database 150.

The present advantage provides an important advantage over the prior art in that it provides for an authorized party to a toll telephone call to access billing information in "real time" either during the actual telephone call itself, or after completion of the telephone call but prior to the requester of billing information hanging up the telephone receiver. An authorized party accessing billing information during the telephone call can use the billing information received to determine whether to continue with the telephone call or to complete it. Additionally, an authorized party accessing billing information after the telephone call has been completed but prior to terminating the telephone call connection by hanging up the telephone receiver can use the cost of the call to appropriately bill a client for the cost of the telephone call, for instance, before the billing statement is received from the telephone system provider.

While the invention has been particularly shown and described with reference to a preferred embodiment, it will be understood by those skilled in the art that various changes in form and detail may be made therein without departing from the spirit and scope of the invention.

What is claimed is:

1. A method of immediately providing, from one of an originating switch and a terminating switch of a toll telephone call on an automated telephone system, the toll cost of the toll telephone call to an authorized party to the toll telephone call upon receipt of a valid request, comprising the steps of:

monitoring the automated telephone system for a sequence entered by the party to the toll telephone call prior to termination of the party's telephone call connection to the automated telephone system;

receiving, at said one of the originating switch and the terminating switch, the sequence entered by the party to the toll telephone call prior to termination of the party's telephone call connection;

verifying, at said one of the originating switch and the terminating switch, whether the sequence entered by the party is a valid sequence;

extracting, from the originating switch, the toll cost of the toll telephone call from the automated telephone system when the sequence entered by the party is a valid sequence;

providing, from said one of the originating switch and the terminating switch, the extracted toll cost to the party prior to the termination of the party's telephone call connection to the automated system;

wherein the party entering the valid sequence is a called patty and the step of verifying whether the sequence entered by the party is a valid sequence is accomplished by the terminating switch of the toll telephone call, and wherein prior to the step of extracting the toll cost, requesting the toll cost from the originating switch of the toll telephone call.

2. The method of claim 1, wherein the sequence is a Dual-Tone Multi-Frequency Signaling (DTMF) sequence.

3. The method of claim 1, wherein verifying that the sequence entered by the party is a valid sequence indicates that the party is authorized to receive the toll cost of the toll telephone call.

4. The method of claim 1, wherein the step of providing the toll cost is accomplished by the terminating switch of the toll telephone call.

5. The method of claim 1, wherein the step of providing the toll cost to the party is accomplished by audible communication.

6. The method of claim 5, wherein the toll cost is read orally to the party.

7. The method of claim 1, wherein the step of providing the toll cost to the party is accomplished by data communication.

8. The method of claim 7, wherein the toll cost is a standard computer signal for computer access.

9. The method of claim 7, wherein the toll cost is a data stream for a hearing impaired party.

10. The method of claim 1, wherein the party enters the sequence during the toll telephone call.

11. The method of claim 1, wherein the party enters the sequence after completing the toll telephone call but before terminating the party's telephone connection to the automated telephone system.

12. The method of claim 1, wherein the following step of providing the toll cost to the party comprises the additional steps of:

inquiring whether the party would like a replay of the toll cost; and replaying the toll cost to the party if the party has requested a replay.

13. The method of claim 1, wherein the step of verifying that the sequence entered by the party is a valid sequence further comprises the steps of:

determining whether the party is responsible for paying for the toll cost of the toll telephone call; and validating the sequence entered by the party if the party is responsible for paying for the toll cost of the toll telephone call.

14. The method of claim 13, comprising the further step of:

validating the sequence entered by the party even if the party is not responsible for paying for the toll cost of the toll telephone call if the party is otherwise authorized to receive the toll cost.

15. The method of claim 1, wherein if the sequence entered by the party is a valid sequence, the toll cost is extracted from a billing information database of the automated telephone system.

* * * * *